Figure 1:
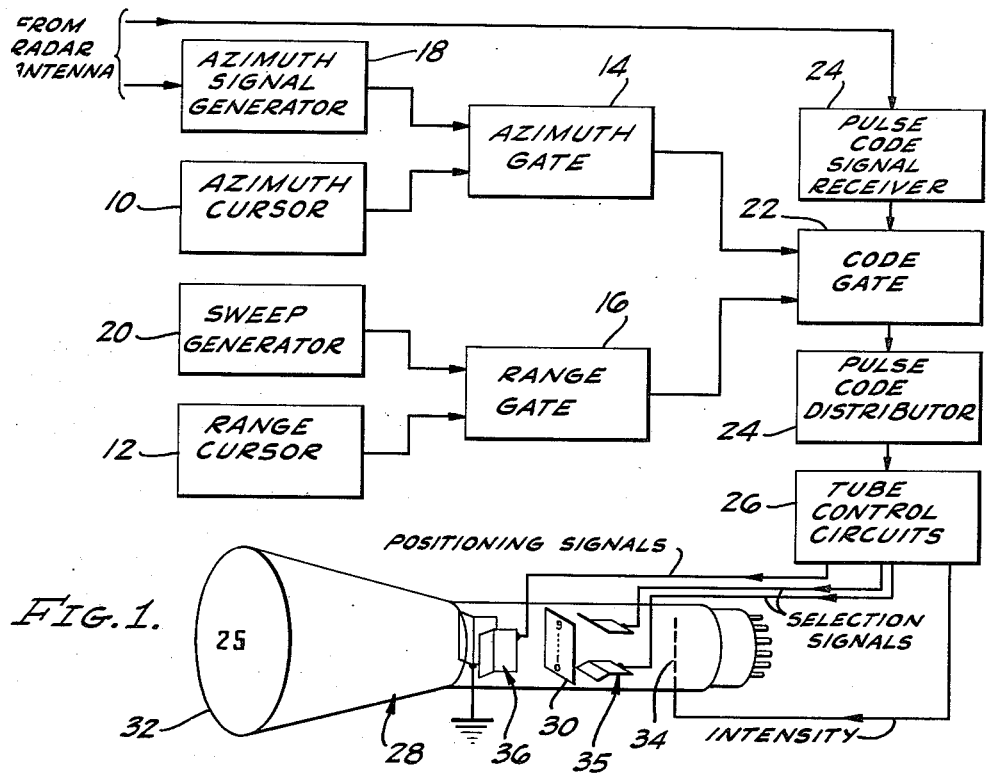

July 31, 1962 J. T. McNANEY 3,047,858

RADAR IDENTIFICATION SYSTEM

Filed Jan. 17, 1958

INVENTOR.
JOSEPH T. McNANEY
BY
Egon W. Mueller
ATTORNEY

United States Patent Office 3,047,858
Patented July 31, 1962

3,047,858
RADAR IDENTIFICATION SYSTEM
Joseph T. McNaney, La Mesa, Calif., assignor to General Dynamics Corporation, Rochester, N.Y., a corporation of Delaware
Filed Jan. 17, 1958, Ser. No. 709,670
6 Claims. (Cl. 343—6.5)

This invention relates to radar identification systems, and more specifically to an improvement in a method means of radar identification and data display.

In an application for a radar identification system by this inventor, which is assigned to a common assignee, Serial No. 682,776, filed September 9, 1957, now Patent No. 2,976,529, a system is described and claimed wherein means are provided for identifying a target by a brightness blip, indicative of its location, associated with a number of letters or characters specifically identifying the target. In other words, there is a radar display in association with a digital identification display. In the system described, a cathode-ray tube is employed of the type which includes an aperture mask. The apertures are in the shape of characters, and the electron beam of the cathode-ray tube is directed to pass through selected ones of these apertures. As a result, the electron beam assumes the cross-sectional shape of the aperture through which it passes. This electron beam thereafter is directed onto the screen of the tube to display the character.

The arrangement described affords a definite identification in association with each target being observed on the display screen of the radar system. Such a specific identification is extremely useful for both military and civilian aircraft surveillance where specific identification of aircraft at a certain location is important for a disposition of that aircraft. It has been found desirable to provide an arrangement whereby presently existing radar installations may be modified so that they can obtain a presentation which specifically identifies the target. Obviously, such an attachment, or modification, of the radar system would be far less expensive than replacing the radar installation with a new one, in accordance with the teaching of the aforesaid McNaney application.

Accordingly, an object of the present invention is to provide an attachment for use with a radar system, whereby identifying data may be displayed for a target being displayed by that radar system.

Another object of the present invention is to provide a novel arrangement for use with a radar system wherein information relating to a particular target may be displayed.

Yet another object of the present invention is the provision of a novel arrangement for use with a radar system whereby, in response to a specific query as to the identification of a target, such identification may be displayed.

Another object of the present invention is to provide a simple and inexpensive attachment for a radar system to enable the identification of individual targets.

These and other objects of the present invention are achieved by employing, for the purposes of data presentation, a cathode-ray tube of the type which incudes an apertured mask which is interposed in the tube between the cathode and the screen. This apertured mask has character-shaped apertures. Means are provided whereby the electron beam may be deflected to pass through a desired one of these character-shaped apertures, thereby assuming the shape of the aperture. The tube of the type intended is found described and claimed in Patents Nos. 2,735,956 and 2,761,988, for Cathode Ray Apparatus, which patents are issued to this inventor.

For purposes of simplification, the apertures in the mask are arranged in a single line so that any one of them may be selected by the amplitude of the selecting voltage. The present invention is contemplated being used in an arrangement whereby, in response to the transmission of a signal from a radar transmitter or beacon, there may be returned the usual echo from the target and, in addition, identifying information consisting, for example, of a pulse code representative of such identification information. A pulse-code signal receiver is provided at the radar receiver which demodulates the signals received from the targets and applies them to a gate.

In accordance with this invention, there is also provided an azimuth and range cursor, each of which is set to the azimuth and range position of the target, for which a display of its identification is desired. The azimuth and range cursors control, respectively, an azimuth gate and a range gate, each of which receives, respectively, an azimuth signal from the radar antenna, or deflection yoke on the radar display tube, and a range signal from the radar sweep generator. When these signals are substantially identical with the settings of the azimuth and range cursors, the respective azimuth and range gates apply outputs to the gate to which the output of the pulse-code signal receiver is applied. This gate is thus enabled to pass the code from the receiver to subsequent circuitry, which converts this pulse-code information to signals which deflect the beam of the character-shaped beam tube to pass through character-shaped apertures which are specified by the pulse code. The screen of the character-shaped beam tube will then display characters identifying the target which has been selected by the settings of the azimuth and range cursors.

Figure 2:
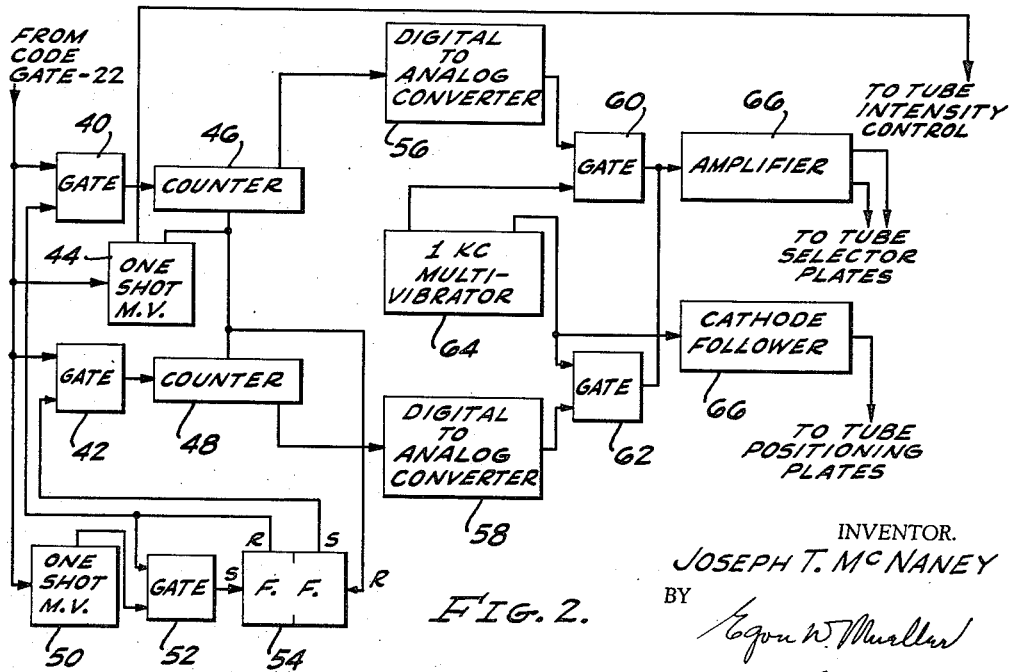

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram of the attachment in accordance with this invention for enabling the radar receiver to display data identifying a target; and FIGURE 2 is a block diagram of an arrangement for a pulse-code distributor and display control circuit suitable for use in the embodiment of the invention.

Referring now to FIGURE 1, there may be seen the block diagram of the embodiment of this invention. This will include an azimuth cursor 10 and a range cursor 12. These comprise well-known circuitry which can be used to set, respectively, an azimuth gate 14 and a range gate 16 so that these gates can provide an output only when a signal is received from a target whose location is defined by the azimuth and range cursor settings. To effectuate this, a second required input to the azimuth gate comprises azimuth signals from an azimuth-signal generator 18 which is coupled to the antenna (not shown). The second required input to the range gate is signals from the sweep generator 20, which is in the associated radar receiver (not shown). An exemplary construction which may be utilized in gates 14 and 16, is that of a cathode coupled binary gate as shown and described in "Pulse and Digital Circuits" by Millman and Taub, published by McGraw Company in 1956, at page 165, FIGURE 5–17. Many other well-known gate circuits may of course also be used to provide an output to code gate 22 upon coincidence of each pair of signals presented to each of the gates 14 or 16.

The arrangement described will be recognized as broadly covering circuits used for obtaining a range marker and for obtaining an azimuth angle marker. These are well-known and accordingly will not be described in detail here. The azimuth and range gate outputs are respectively applied to a code gate 22. The pulse-code signal receiver 24 receives the pulse-code signals from the target, whereby it identifies itself. The pulse-code signal receiver 24 is connected to the radar antenna of the radar system with which this invention is associated. In accordance with the description thus far provided, it should be obvious that the code gate 22 is opened to enable the application of the pulse-code signals from the receiver therethrough only when the azimuth and range gate outputs are present simultaneously. Accordingly, the pulse-code transmission from the target whose identity is desired is isolated by the circuitry described.

Any desired code may be employed for identifying the target. For the purposes of this explanation, assume that the target is identified by two decimal digits, each of which is coded in the form of a train of pulses, the number of which corresponds to the decimal digit. The two pulse trains are separated by a predetermined interval. The output from the code gate 22 will therefore be two pulse-train series which are applied to a pulse-code distributor 24. This may include circuitry for converting the serial pulse distribution into a parallel type of distribution by the simple expedient of counters which staticize each train of pulses. The output of the pulse-code distributor 24 is applied to circuitry, identified as tube control circuits 26. These circuits perform the function of converting the digital code manifestation into an analog selection voltage, also turning on the cathode-ray beam in the character beam-shaped tube 28 and providing positioning signals so that the tube digits identifying the target which are displayed are adjacent one another in the proper order.

As previously recited, the tube to be employed may be of the type described and claimed in Patents Nos. 2,735,956 and 2,761,988. For simplification and not as a limitation on the invention, the character-shaped aperture mask 30 shown in the tube 28 will have character-shaped apertures disposed in a vertical column. As a result, only one selection voltage is required to be applied to the selection plates 35, in order to deflect the cathode-ray beam to pass through one of the character-shaped apertures. Thus, the two pulse trains in the code received from a target can specify in sequence two digits, which are displayed on the screen 32 of the tube, adjacent one another. The intensity grid 34 of the tube has a signal applied thereto from the control circuits to turn on the cathode-ray beam when pulses are applied to the pulse-code distributor 24. Voltages are applied to the positioning plates 36 to position the two digits on the screen adjacent one another.

Reference is now made to FIGURE 2, which shows a block diagram of the arrangement for circuits to control the tube 28 to display the digits identifying a target in response to the received pulse-code signals. The output of the code gate 22 is applied to a first and second gate 40, 42, to a one-shot multivibrator 44, and to a second one-shot multivibrator 50. The one-shot multivibrator is a designation applied to the well-known two tube circuitry which has a stable condition wherein one of its tubes is conducting and the other is not, and an unstable condition where the tubes effectively exchange conduction. The one-shot multivibrator may be driven from its stable to its unstable condition by the application of a pulse. In response to the first pulse received, the one-shot multivibrator is driven to its unstable condition, where it remains for a time determined by the values of the components of which it is constructed. It then returns to its stable condition.

In its stable condition, the one-shot multivibrator 44 applies an output to the intensity control of the tube 28, whereby the tube cathode-ray beam is maintained turned off. Upon being driven to its unstable condition, this output is cut off and the cathode-ray beam of the tube is turned on. The time constant of one-shot 44 is selected to be that for the interval during which it is desired that the digital identifying information be displayed on the screen 32 of the tube 28. When one-shot 44 returns to its stable condition, it resets a first and second counter, respectively, 46 and 48, and turns off the cathode-ray beam of the tube 28.

A second one-shot multivibrator circuit 50 is provided, which is driven from its stable to its unstable condition in response to the first pulse received from the code gate 22. The interval wherein the one-shot 50 remains in its unstable condition is that required for the transmission of one of the two pulse trains. At that time, it returns to its initial, or stable, condition. In returning to its stable condition, it applies its output to a gate 52. The second required input to this gate is the reset output of a flip-flop circuit 54.

The flip-flop circuit 54 has two stable conditions, one of which is designated as "reset" and the other as "set." While it is in its reset stable condition, the output of the flip-flop circuit 54 is also applied to the gate 40, whereby this gate 40 is enabled to pass the output received from the code gate 22. The output of the gate 40 is applied to a counter 46, which counts these pulses. When one-shot 50 returns to its stable condition after an interval sufficient to allow the first pulse train to be counted, gate 52 can apply the output of one-shot 50, which occurs at this time, to set the flip-flop 54. The set output of flip-flop 54 enables gate 42. Gate 40 at this time is closed, and gate 42 can then apply the next train of pulses to the counter 48 to be counted. When one-shot 44 returns to its stable condition, in addition to resetting counters 46 and 48, it also resets flip-flop 54.

The output of the respective counters 46, 48 are applied, respectively, to the digital-to-analog converters, respectively 56, 58. These digital-to-analog converters are circuits which perform the function of converting the count manifested by the counters to a representative voltage. These circuits are well known in the art and need not be described here. The outputs of the respective digital-to-analog converters are applied to associated gates 60, 62. These gates are alternately opened in response to the output of a 1 kc. multivibrator 64. The gate outputs, consisting of the voltages whose amplitudes are representative of the counts in the respective counters, are applied to an amplifier 66. This amplifier is of the well-known type which provides a push-pull output in response to its input. Thus, the output of amplifier 66 will alternately be a voltage whose amplitude represents the first pulse train received and thereafter a voltage whose amplitude represents the second pulse train received. The amplifier 66 output is applied to the selecting plates 35 of the character beam-shaped tube 28.

The cathode-ray beam, in response to the operation of the selection signals, is thus shaped alternately into the two digits which identify the target. The 1 kc. multivibrator output is applied to a cathode follower 66, whose output is applied to the tube-positioning plate 36 as a positioning signal to allow the two digits to be positioned adjacent one another.

The two identifying digits of the target will be displayed on the screen of the tube 28 at a 1 kc. rate which is sufficiently high so that persistence of vision will see the two digits substantially simultaneously. The interval during which these are displayed is determined by the time constant of the one-shot multivibrator 44. When this returns to its stable condition, all circuits are reset, and the system is in condition to receive the next pulse-code signal trains.

The arrangement which has been described is one which can be readily associated with a radar system of the general type described. The only signals required from the radar system are the azimuth and sweep signals, the remaining circuitry being provided in the attachment for the radar system. The arrangement may be remotely positioned from the radar system receiving its signals therefrom over a line, and the azimuth and range cursors may likewise be remotely operated for the purpose of displaying the personal identity of a single target on the face of the tube.

Accordingly, there has been described a novel, useful, and simple identification system for a single target which may be employed in conjunction with the radar system for the purpose of isolating signals from the desired target representative of the identity and then converting those signals for presentation on the screen of a character beam-shaped tube. It will be apparent that other coding arrangements than the one described may be employed and, further, other arrangements may be employed for converting the code into analog signals for selecting the one of the character-shaped apertures corresponding to the code without departing from the spirit and scope of this invention.

I claim:

1. In a radar system of the type wherein in response to an inquiry from a transmitter there is received from an equipped target a pulse code representing characters identifying said target, means for identifying a desired target comprising a pulse-code receiver, gate means to which output from said receiver is applied, means for establishing the location of a desired target, means for enabling said gate when a response to an inquiry is received from the location established by said means for establishing, means responsive to output from said gate means to establish potentials analogous to said pulse code, and cathode-ray tube apparatus to which said potentials are applied for displaying characters identifying said desired target in response to said potentials.

2. In a radar system of the type wherein in response to an inquiry from a transmitter there is received from an equipped target a pulse code representing characters identifying said target, means for identifying a desired target comprising means for establishing the azimuth and range of a desired target, a pulse-code receiver, gate means to which the output from said receiver is applied, means for enabling said gate means when a response to an inquiry is received from a target having the established azimuth and range, means to which output from said gate means is applied to establish potentials analogous to said pulses, and cathode-ray tube apparatus to which said analogous potentials are applied for displaying characters identifying said target responsive to said potentials.

3. In a radar system as recited in claim 2 wherein said cathode-ray tube apparatus includes an electron beam-generating means at one end, a screen at the other end, a masking plate positioned in the path of an electron beam from said generating means to said target, said masking plate having a plurality of character-shaped apertures, and means to deflect said electron beam through one of said apertures responsive to the amplitude of a potential applied thereto.

4. In a radar system of the type wherein in response to an inquiry from a transmitter there is received from an equipped target a pulse code representing characters identifying said target, means for identifying a specific target comprising means for establishing the azimuth and range of a specific target, a pulse-code receiver, a gate to which the output from said receiver is applied, means to enable said gate to pass output from said pulse-code receiver when a response to an inquiry is received from a target having the established azimuth and range, cathode-ray tube apparatus of the type including an electron beam, a screen, a character-shaped aperture mask positioned to intercept said beam on its way to said screen, and means for selectively deflecting said electron beam through a desired one of said apertures to shape the cross section of said electron beam correspondingly, means to convert pulse-code output from said gate to analogous character-shaped aperture-selecting potentials, and means to apply said selecting potentials to said means for selectively deflecting said electron beam whereby the characters identifying said specific target are displayed on the screen of said cathode-ray tube.

5. In a radar system of the type wherein in response to an inquiry from a transmitter there is received from an equipped target a pulse code representing characters identifying said target, the combination for identifying a desired target comprising: a pulse code receiver; gate means to which output from said receiver is applied; means for selecting the azimuth and range of a desired target; means for enabling said gate, when a response to an inquiry is received from the azimuth and range of said desired target; means responsive to output from said gate means to establish potentials analogous to said pulse code; and display apparatus to which said potentials are applied for displaying characters identifying said desired target in response to said potentials.

6. In a radar system of the type wherein in response to an inquiry from a transmitter there is received from an equipped target a signal identifying said target, means for identifying a desired target comprising: a receiver for said identifying signal; gate means to which output from said receiver is applied; means for selecting the azimuth and range of a desired target; means for enabling said gate when a response to an inquiry is received from the azimuth and range of said desired target; means responsive to the output from said gate means to establish potentials analogous to said identifying signal; and display apparatus to which said potentials are applied for producing a display identifying said desired target in response to said potentials.

References Cited in the file of this patent
UNITED STATES PATENTS

| | | |
|---|---|---|
| 2,595,141 | Herbst | Apr. 29, 1952 |
| 2,735,956 | McNaney | Feb. 21, 1956 |
| 2,796,602 | Hess et al. | June 18, 1957 |